(12) United States Patent
Coccia

(10) Patent No.: US 10,238,231 B2
(45) Date of Patent: Mar. 26, 2019

(54) COFFEE MACHINE WITH DISPENSING PRESSURE REGULATION AND A METHOD RELATING THERETO

(75) Inventor: Andrea Coccia, Binasco MI (IT)

(73) Assignee: GRUPPO CIMBALI S.p.A., Binasco MI (IT)

( * ) Notice: Subject to any disclaimer, the term of this patent is extended or adjusted under 35 U.S.C. 154(b) by 834 days.

(21) Appl. No.: 12/909,305

(22) Filed: Oct. 21, 2010

(65) Prior Publication Data

US 2011/0094389 A1    Apr. 28, 2011

(30) Foreign Application Priority Data

Oct. 23, 2009   (EP) ...................................... 09425422

(51) Int. Cl.
    *A47J 31/44*        (2006.01)
    *A47J 31/36*        (2006.01)
    *A47J 31/52*        (2006.01)

(52) U.S. Cl.
    CPC ............... *A47J 31/36* (2013.01); *A47J 31/52* (2013.01)

(58) Field of Classification Search
    CPC ............. A47J 31/36; A47J 31/52; A47J 31/54
    USPC ........... 426/231, 520, 394, 594, 432; 99/283
    See application file for complete search history.

(56) References Cited

U.S. PATENT DOCUMENTS 3,988,974 A * 11/1976 Kaplan ............................ 99/285
4,736,875 A *  4/1988 King ............................... 222/641
5,974,949 A * 11/1999 Weber et al. ............... 99/289 R
7,322,275 B2   1/2008 Lusi
2005/0076788 A1 * 4/2005 Grant et al. ..................... 99/279
2005/0247204 A1 * 11/2005 Lafond et al. .................. 99/279
2006/0096465 A1   5/2006 Hu et al.

FOREIGN PATENT DOCUMENTS

EP   1839541   * 10/2007  .............. A47J 31/00
EP   1867262   * 12/2007  .............. A47J 31/54

OTHER PUBLICATIONS

Pumps NPL, http://www.1st-line.com/cofffact/vibration-vs-rotary.htm, 2010.*

* cited by examiner

*Primary Examiner* — Erik Kashnikow
*Assistant Examiner* — Preston Smith
(74) *Attorney, Agent, or Firm* — Alan G. Towner, Esq.; Leech Tishman Fuscaldo & Lampl

(57) ABSTRACT

A coffee machine for producing and dispensing coffee-based beverages is disclosed comprising a hydraulic pump, at least one dispensing device with a filter unit adapted to contain ground coffee, and a water supply unit. A hydraulic circuit brings the hydraulic pump into fluid communication with the supply unit of the dispensing device to supply hot water under pressure to the supply unit. A system for controlling the dispensing pressure comprises a control unit and a pressure sensor to transmit signals representative of the pressure detected to the control unit to detect the disposing pressure. The hydraulic pump supplies variable quantities of water and may be actuated by an electronic drive controlled electronically by the control unit in order to select the flow of water supplied by the pump. A method for controlling the dispensing pressure in a coffee machine is also disclosed.

3 Claims, 2 Drawing Sheets

COFFEE MACHINE WITH DISPENSING PRESSURE REGULATION AND A METHOD RELATING THERETO

This application claims priority to EP Application No. 09425422.4 filed 23 Oct. 2009, the entire contents of which is hereby incorporated by reference.

The present invention relates to a coffee machine provided with water pressure regulation and a method for controlling the pressure in the infusion chamber of a coffee machine.

Coffee, as a drink, has always been very widespread and popular; in fact, it is nowadays available in many forms which differ from one another in terms both of their starting blend and the way in which the beverage is extracted.

Espresso coffee in particular is a beverage obtained using a coffee machine which forces hot water to pass through a layer of ground coffee, i.e. coffee powder, contained in an infusion container, generally a metal filter. The water which passes through the layer of coffee has to be heated to a certain temperature and is subject to a certain pressure, the optimum temperature and pressure being selected, among other things, in relation to the starting blend.

Coffee powder for the preparation of espresso coffee is typically obtained by grinding or milling roasted coffee beans.

In order to force hot water to pass through the coffee powder, the initial machines used the thrust of the pressure generated by the saturated steam boiler having a value of 1-1.5 bar. A pressure of from 1 to 1.5 bar corresponds to a temperature of more than 100° C. and therefore, as for obtaining a high quality beverage the water for its preparation should not exceed 100° C., the coffee obtained from the machines tended to have a "burnt" taste.

To remedy this problem, coffee machines were developed with mechanical compression means which made it possible to obtain an infusion at approximately 100° C. with a relatively high pressure.

Swiss Patent CH 262 232 discloses a tap for an apparatus for the preparation of espresso coffee which comprises a cylinder communicating with the lower portion of the boiler and containing a hollow piston adapted to be raised in opposition to a spring, allowing the water to enter the piston, and to be lowered under the action of the spring in order to expel the water through the base of the cylinder formed by a detachable filter adapted to contain the ground coffee.

U.S. Pat. No. 2,878,747 discloses a coffee machine which includes a boiler for boiling water, a coffee percolator borne by a support bracket and comprising an infusion chamber, a cylinder above the chamber having an inlet, a duct connecting the inlet with the boiler to enable boiling water to be conveyed into the cylinder, and a piston moving in a reciprocating manner in the cylinder in order to control the inlet and force the boiling water into the infusion chamber when the piston is lowered.

U.S. Pat. No. 3,119,322 discloses a coffee machine which has a container for the infusion of the water, a pump for generating pressure in the container, an electric motor for supplying the pump and coffee preparation units connected to the container which have simple distribution cocks, a rotary shaft disposed along the units and provided with cams, a switch in the motor circuit positioned such that it can be actuated by the shaft, in which the cocks have manual operation levers each positioned so as to engage one of the cams in order to rotate the shaft which actuates the switch and starts the motor.

In order to counter the greater thrust of the water in the infusion chamber as a result of mechanical systems, the coffee is generally finely ground so as to increase the overall contact surface with the water and improve the extraction of the beverage while using smaller quantities of ground coffee.

With the development of hydraulic devices to increase the pressure of the water supplied to the infusion chamber without having to vary the temperature, it has been possible to generate high pressures of as much as 10 bar or higher. It has nevertheless been observed that the use of a pressure above 10 bar may have adverse effects. Raising the pressure beyond a certain value makes it necessary in practice to grind the coffee very finely and thus to refine the filters with the result that the excessively fine grinding could ultimately cause the filter to become obstructed leading to problems of high stresses on the sealing members and ducts, thereby worsening the quality of the beverage.

Patent application EP 1210893 discloses a coffee extraction device in a machine dispensing drinks in cups, in which the coffee is produced by supplying the hot water to a cylinder provided with a piston in which the raw material is loaded in order to pressurise the interior of the cylinder so as to percolate and extract the concentrated solution through a filter. The apparatus is provided with a pump for the hot water and means for controlling the pump adapted to vary the quantity of hot water supplied to the cylinder.

U.S. Pat. No. 3,230,974 discloses a distribution head for a coffee machine which allows for an infusion time interval between the opening of the cock and the distribution of the beverage. In practice, before applying the thrust to obtain the pressure value needed to dispense the coffee, the ground coffee powder is filled for a certain period of time with water at a pressure lower than the dispensing pressure, for example 1.5 bar.

Typically, in current preparations of espresso or filter coffee, the temperature of the water supplied to the infusion chamber is between approximately 88 and 98° C. and in some machines the pressure varies from approximately 0.8 to 1.5 bar in the initial infusion period and is then increased to approximately 9 bar during the extraction of the beverage.

Patent Application EP 0934719 discloses a method for preparing an espresso coffee from a predetermined dose of coffee powder through which a predetermined quantity of hot water is passed under the action of a pump at a given maximum pressure, which comprises a preliminary step during which the dose of coffee powder is wetted by an initial quantity of hot water at a pressure below the given maximum pressure for a certain period of time.

The size of the ground coffee grains is a variable which determines the final result of the beverage.

Patent application WO 2009/010190 discloses a method for controlling a coffee machine grinder comprising a step of measuring the actual value of a physical quantity relating to the percolation process and a step of modifying the ground coffee grain size at least for the next percolation so that a possible detected deviation between the actual value measured and a reference value for the physical quantity is compensated. The physical quantity may be the percolation flow, the percolation time or the hydraulic pressure in the percolation circuit.

As coffee prepared by the extraction method has spread throughout the various countries, it has been adapted to existing tastes and customs. Generally, a distinction is made between a espresso coffee (Mediterranean) dispensed into a cup in a quantity which may typically vary from 15 to 25 $cm^3$ and a "café crème" dispended into a cup in a quantity which may typically vary from 100 to 120 $cm^3$, the total dispensing time being roughly equal in both cases, for example 25 seconds. There are obviously many variants within these two kinds of coffee.

In order to obtain the desired quantity of a particular kind of coffee in the same dispensing time, the flow of the water for the dispensing operation has to be varied by adapting the fineness of the grinding in order to change the resistance with which the coffee contained in the filter opposes the passage of the water.

By their nature, coffee mixtures differ in terms of their quality, consistency, fat content, degree of roasting and humidity. A variation even in only one these properties makes it advisable to correct the fineness of the grinding in order to keep the flow of dispensing water characterising a given type of coffee constant. On the other hand, it is difficult to accurately control the grinding process and the resulting ground compound is generally formed by a distribution of small grains whose shape and dimensions vary. As a result, a dose of ground coffee taken from the grinder is never exactly the same as another, causing the resistance with which the ground coffee opposes the water to fluctuate around the optimum value and therefore a variation in the rate of flow of the water with a resulting variation in the pressure of the water during dispensing. The dispensing time may be taken as a reference parameter for the resistance opposed by the water. If the coffee is too finely ground, the water will take a long time to pass through the powder leading to excessive extraction which gives the beverage an unpleasant taste. If the coffee is too coarsely ground, the water passes through the powder rapidly without managing to extract much of the substances.

The Applicants have observed that, preferably, once a nominal reference value for the dispensing time, $t_e$, has been determined, for example from an evaluation of the statistical type of the quality of the beverages resulting from a number of dispensing operations, the dispensing time, $t_e$, should not vary from a given nominal value outside a certain variability interval. For example, if $t_e^o$ is 25 seconds, $t_e=25\pm1$ s with a maximum standard deviation of ±3 seconds. A dispensing time outside the variability interval may indicate an "anomalous" resistance with which the content of the filter is opposing the water and therefore that the quality of the resulting beverage may have deteriorated.

The Applicants have observed that it would be advantageous in particular to be able to dispense the beverage in a controlled manner, and possibly to act on the water pressure in response to a variation in the grain size of the coffee.

An object of the present invention is to provide a coffee machine able to dispense beverages prepared from different blends of raw material and/or ground to different finenesses and/or defined by different preparation processes.

A further object of the present invention is to provide a coffee machine which makes it possible to control the whole cycle of pressurisation of the coffee during dispensing by acting on the value of the flow of water in order to enable a regulation of the preparation of the beverage with a view to ensuring a high quality beverage.

According to an aspect, the present invention is directed to a coffee machine comprising a dispensing pressure control system. The "dispensing pressure" is understood as the pressure of the water supplied to the filter unit which contains the ground coffee.

The present invention relates in particular to a coffee machine for producing and dispensing coffee-based beverages comprising a hydraulic pump, a dispensing device comprising a filter unit adapted to contain coffee powder and a supply unit adapted to introduce water into the filter unit when the filter unit is connected to the supply unit and a hydraulic circuit which brings the hydraulic pump into fluid communication with the supply unit of the dispensing device, the hydraulic circuit comprising a supply duct which supplies hot water under pressure to the supply unit. The coffee machine further comprises a dispensing pressure control system which comprises a control unit, a pressure sensor arranged along the hydraulic circuit and adapted to generate a control signal representative of the pressure detected, the pressure sensor being electronically connected to a control unit in order to detect the dispensing pressure, in which system the hydraulic pump is adapted to supply variable quantities of water and is actuatable by an electronic drive controlled electronically by the control unit in order to regulate the flow of water output from the pump as a function of a detected dispensing pressure value.

In another aspect, the present invention relates to a method of controlling the dispensing pressure in a coffee machine.

The present invention relates in particular to a method for controlling the dispensing pressure in a coffee machine for producing and dispensing coffee-based beverages including a dispensing device comprising a filter unit adapted to contain ground coffee, the method comprising: supplying a predetermined quantity of water from a hydraulic pump at a flow rate corresponding to at least one nominal dispensing pressure value to a hydraulic circuit in fluid communication with the hydraulic pump and with the dispensing device, the hydraulic pump being actuatable by an electronic drive; detecting at least one water dispensing pressure value by a pressure sensor arranged along the hydraulic circuit and, if at least the one detected value of the dispensing pressure deviates from the at least one nominal pressure value, and adjusting the water flow rate supplied by the pump as a function of the at least one detected pressure value.

In the present description and the accompanying claims, "infusion" indicates the step of wetting of the coffee powder contained in the filter and "extraction" indicates the step using the technical process which forces the hot water under pressure through the ground coffee.

The infusion step generally takes place at pressure lower than the extraction pressure. The dispensing step indicates the overall step of preparation of the beverage including both the infusion and the extraction steps.

The present invention will be described in further detail below with reference to the accompanying drawings in which some but not all of its embodiments are shown. The drawings illustrating the embodiments are diagrammatic representations and are not to scale. In the drawings.

Figure 1:
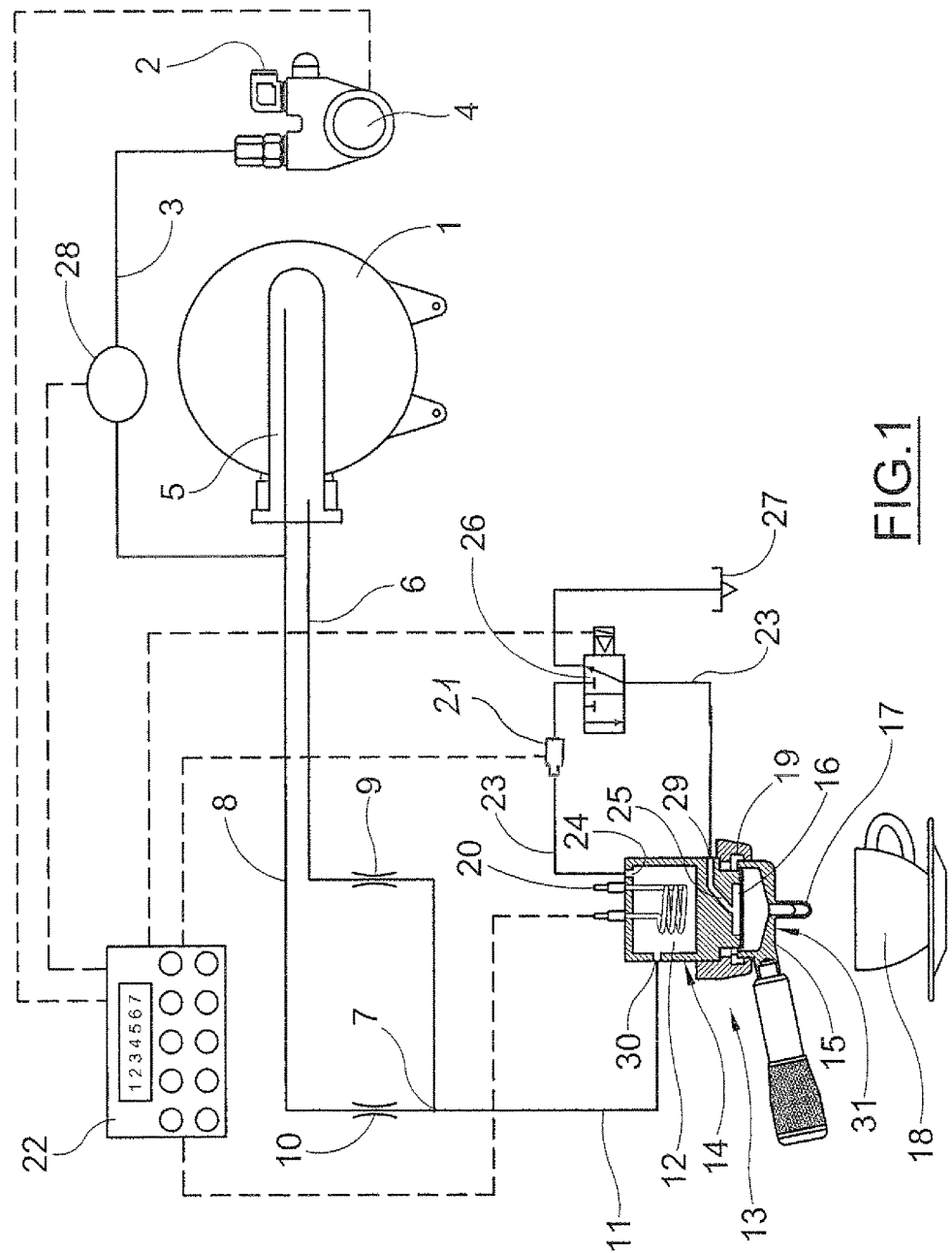
FIG. 1 shows a hydraulic circuit and a control circuit for a coffee machine, in an embodiment of the present invention.

FIG. 1 is a diagram of a hydraulic circuit for an espresso coffee machine which supplies a coffee dispensing device, indicated overall by 13. A conventional boiler 1 for the production of hot water and steam is supplied in a conventional manner and not shown in the figure by an external water source of cold water 2. The water source 2, via a duct 3 and a hydraulic pump 4, supplies a heat exchanger 5, also conventional, disposed within the boiler 1. The hydraulic pump 4 is a motor pump actuated by an electronic drive.

The output of the heat exchanger 5 supplies heated water via a duct 6 to a mixing point 7 which is also reached by a duct 8 connected to the duct 3 supplying cold water.

Flow calibrators, shown by 9 and 10 respectively, are optionally included on the hot water duct 6 and on the cold water duct 8, upstream of the mixing point 7.

These flow calibrators make it possible to regulate the quantity of cold with respect to hot water so as to obtain a flow of mixed water in the supply duct 11 at a supply temperature T1. Downstream of the mixing point 7, the mixed water reaches the dispensing device 13.

The dispensing device 13 comprises a supply unit 14 for discharging the water under pressure to a filter unit 31 which comprises a filter-holder 15, a filter 16 and a nozzle 17 for the supply of the coffee under which a collection cup 18 is disposed in operation. In the embodiment shown, the supply unit 14 includes a heating chamber 12, in the form of a small boiler, and a dispensing duct 25 obtained in the supply unit 14 and, in this particular embodiment, in the structure acting as the base of the heating chamber, the duct communicating immediately upstream of the filter 16.

Connection means 19 are provided on the supply unit 14 for the detachable connection of the filter-holder 15.

The plurality of ducts which bring the pump into fluid communication with the dispensing device, and in particular with the filter unit, form a hydraulic circuit.

The heating chamber 12 is provided with an electrical resistance 20 for heating the water to a dispensing temperature T2 suitable for the formation of the coffee beverage, which temperature is greater than the temperature T1 of the water downstream of the mixing point 7 which acts as a source as regards the heating chamber 12.

The hot water under pressure is caused to flow through the supply duct 11 to the heating chamber 12 via the inlet 30, in which chamber is stabilised in temperature, and is then introduced into the filter unit 31. More particularly, the water is introduced into the filter-holder 15 via a duct 23 which connects the outlet 24 of the heating chamber 12 to the inlet 29 of the dispensing duct 25.

The duct 23 is provided with an electrovalve 26 which has at least two operating positions. This electrovalve 26, in one position, causes the water to be supplied to the filter-holder and thus the formation of the beverage, and in the other position it discontinues the supply of the water and communicates with a discharge 27 external to the machine.

A pressure sensor 21 is arranged along the hydraulic circuit in fluid communication with the pump and the dispensing device. The pressure sensor is preferably arranged along the connection duct 23 which supplies the water under pressure from the heating chamber 12 to the dispensing duct 25, upstream of the electrovalve 26 or downstream of the electrovalve 26, in the vicinity of the inlet 29 of the duct 25. In a particular preferred embodiment, the pressure sensor is disposed upstream of the intercepting electrovalve in order to prevent any ground coffee residue from the dispensing duct from soiling the sensor.

In another embodiment (not shown in the figure), the pressure sensor is arranged along the supply duct 11.

In a further embodiment (not shown in the figure), the pressure sensor is arranged in the heating chamber 12.

In general, it is preferable for the pressure sensor to measure the actual pressure of the water supplied to the filter unit. The sensor is preferably arranged in the vicinity of the dispensing device.

The pressure sensor 21 is apt to generate a control signal representative of the water pressure and is connected to a control unit 22 such as an electronic central processing unit (CPU). The pressure sensor is, for example, a transducer which supplies the control unit 22 with a signal proportional to the pressure of the water reaching the dispensing device and in particular the filter unit 31.

The operating positions of the electrovalve 26 are preferably controlled by the control unit 22.

The control lines through which the control signals from and to the control unit 22 pass are shown by dashed lines in the drawings.

In a preferred embodiment, the water supplied to the inlet 30 of the heating chamber 12 from the supply duct 11 downstream of the mixing point 7 is already at a relatively high supply temperature T1 (for example no lower than approximately 80° C.) and therefore the heating time needed to reach the optimum temperature T2 for the formation of the beverage (for example approximately 90° C.) is small, thereby reducing the time needed for the preparation of the beverage and in particular eliminating waiting times between the dispensing of one dose of coffee and the following dose as a result of having to wait for the water to reach the required temperature. According to an embodiment, the temperature T1 is 10 to 20° C. lower than the temperature T2.

In the case of a relatively high temperature T1, the electrical power needed for the electrical resistance 20 to start and to stabilise the temperature to the temperature T2 for the preparation of the beverage is relatively low, for instance no higher than 0.8 kW, even when dispensing relatively large quantities of beverage, for instance from 120 to 250 $cm^3$.

The operation of the heating resistance 20 is preferably controlled by a temperature sensor (not shown in the figure) in contact with the water in the heating chamber in order to detect the dispensing temperature T2 and is logically connected to the CPU 22.

It will be appreciated that the present invention is not limited to a particular method of supplying hot water at a dispensing temperature to the dispensing duct.

For instance, in one embodiment, the heating chamber receives water at ambient temperature which is heated to the temperature T2 by the resistance disposed in the heating chamber. In this embodiment, the hot water duct 6, which conveys the water from the heat exchanger to be mixed with the cold water from the duct 8 upstream of the heating chamber, is omitted and the heating chamber is supplied solely by the water from the duct 8.

Again by way of example, in one embodiment the dispensing device does not comprise a heating chamber and the supply duct in fluid communication with the dispensing device supplies water under pressure at the dispensing temperature T2 to the supply unit.

The hydraulic circuit is preferably provided with a flow rate measurement device 28 apt to measure the flow rate of water passing through it. The device 28 is connected to the control unit 22 to which it sends a signal representative of the measured flow of water. For example, the device 28 supplies the control unit 22 with electrical pulses whose number is proportional to the quantity of water passing though it in accordance with a metering constant expressed in $cm^3$/pulse.

In an embodiment, the device 28 is of the type disclosed in British Patent Application GB 2 008 540.

In the embodiment of FIG. 1, the device is disposed on the cold water duct 3 downstream of the pump 4. The frequency with which the control unit receives these pulses is directly proportional to the flow of water supplied to the hydraulic circuit by the pump 4 and therefore to the dispensing device.

The pump 4 is preferably actuated at variable speed by an electronic drive (e.g. a variable speed drive VSD) via which the speed of rotation of the pump may be varied. The pump is, for example, actuated by a variable frequency electronic control unit, whose frequency variation corresponds to a variation of the rotational speed of the pump. In this way, it is possible to vary the flow of water supplied by the pump to the duct 3 and therefore the water pressure. The quantity of water supplied to the hydraulic circuit corresponding to one dispensing operation, or in one dispensing step, depends on the type of coffee, for instance 20 cm$^3$ for an espresso coffee.

The pump, namely the electronic control unit connected to the pump motor, is connected to the control unit 22 which regulates the speed of rotation of the pump and therefore the pressure of the water supplied to the hydraulic circuit. For instance, the control signals from or to the control unit are pulse width modulation (PWM) control signals and the speed of the pump is regulated by varying the width of the signal supplied to the electronic drive of the pump.

A flow rate of water and a "nominal" pressure of the water supplied to the hydraulic circuit correspond to a speed of rotation of the pump actuated for a given period of time. The "actual" dispensing pressure is measured by the pressure sensor, preferably in the vicinity of the dispensing device. A deviation between the nominal pressure and the actual pressure may indicate an "anomalous" dispensing and therefore a possible deterioration of the quality of the beverage.

In a machine as described in the present embodiment, it is possible to control and, if necessary, adjust the value of the dispensing pressure, at least for a subsequent dispensing of coffee and in some embodiments during the dispensing step itself.

Adjustment of the flow rate of water supplied by the pump as a function of the dispensing pressure detected can be carried out manually by an operator and/or by means of an automatic regulation in which the signals received by the pressure sensor and the electronic drive of the pump form a feedback loop controlled by the control unit.

Preferably, the system for controlling pressure included in the coffee machine enables automatic regulation of the dispensing pressure, in which the signals received by the pressure sensor, the electronic drive of the pump and the water flow measurement device form a feedback loop.

For example, at the beginning of a dispensing operation, the pump 4 is started with a certain speed of rotation corresponding to the supply of a predetermined flow of water introduced into the hydraulic circuit and therefore to a nominal dispensing pressure value, e.g. 9 bar. The water supplied by the pump passes through the flow rate measurement device 28 which measures its actual flow rate (for example in cm$^3$/s). If the control unit detects, from the flow rate measurement device, a flow rate which is too low or in general below the flow rate corresponding to the nominal pressure (for example, the frequency of the pulses received by the device is too low), the dispensing operation is taking place more slowly, because, for example, the coffee in the filter is too finely ground, leading to an increase in the dispensing time with respect to the nominal dispensing time, for example 25 seconds. If, on the other hand, the control unit detects a flow rate which is too high, the dispensing operation is taking place too rapidly, because, for example, the coffee in the filter is too coarsely ground, leading to a reduction of the dispensing time with respect to the nominal dispensing time. When it detects a flow rate which does not correspond to the optimum flow value, the control unit adjusts the speed of rotation of the pump until the flow rate reaches the optimum value. The control unit also receives the actual dispensing pressure value. The control unit stops the pump when the quantity of water which has passed through the flow rate measurement device is equal to the quantity of water corresponding to one dispensing operation. The regulation of the flow of water causes the dispensing time to be substantially equal to the nominal dispensing time, for example 25s±1 s.

It is also possible for the pressure to have a predetermined value or to follow a predetermined curve of values during the dispensing operation.

The pressure behaviour may be controlled by the control unit 22 which is connected to the electronic drive of the pump and to the pressure sensor and, in preferred embodiments, to the flow rate measurement device. The control unit monitors the pressure of the water supplied to the dispensing device by means of the pressure sensor. The electronic drive of the pump is controlled by the control unit to actuate the pump at a predetermined speed so as to keep the pressure at a certain value established within a time interval or at a variable speed within the time interval so that the pressure of the water during dispensing follows a predetermined curve.

The control unit may be operationally associated with a display and an input device such as a keyboard which may be operated by an operator in order to control and/or modify the flow of water supplied to the hydraulic circuit and therefore the dispensing pressure. For example, depending on the type of coffee used and/or the settings of the coffee grinder which supplies coffee powder for the coffee machine, it is possible to define a curve of pressure during dispensing.

According to a particular aspect, the invention relates to a method for controlling the hydraulic pressure of the water supplied to the dispensing device of a coffee machine.

Figure 2A:
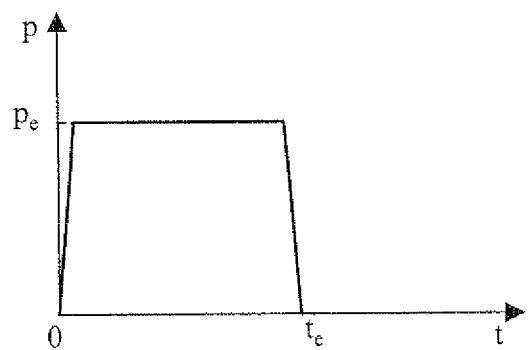
FIGS. 2a to 2c are graphical representations of the water pressure as a function of time for a single dispensing step, according to some embodiments of the invention.
Figure 2B:
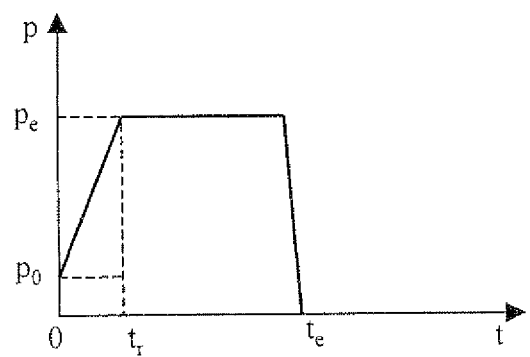
Figure 2C:
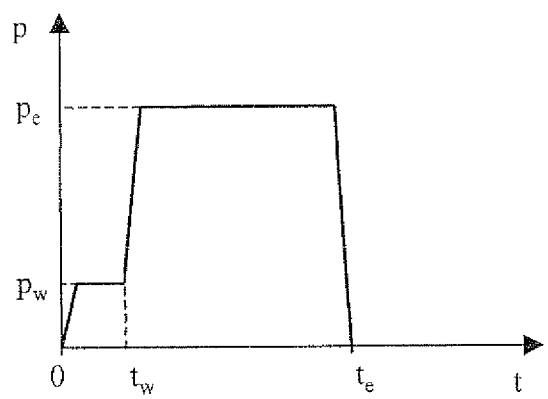

FIGS. 2a to 2c are graphical representations of the water pressure as a function of time for a single dispensing step, according to various embodiments of the invention.

FIG. 2a shows a curve of the pressure within the dispensing time interval equal to $t_e$. In this case, once the pressure value $p_e$ has been set during dispensing of the beverage, the control unit controls the electronic drive to actuate the pump at a predetermined speed. This predetermined speed corresponds to a predetermined beverage extraction pressure $p_e$, for example 9 bar. The pressure reaches the operating value as soon as the speed of the pump reaches the predetermined value, typically in a time which is negligible with respect to the dispensing time $t_e$. The pressure curve is monitored by the control unit which receives the data supplied by the pressure sensor. If necessary, the control unit adjusts the speed of the pump if the pressure value does not correspond to a certain target value or if the quality of the product is altered, for example as a result of variations in the grain size of the ground coffee. In this way, subsequent dispensing of the beverage may be carried out with correct parameters.

In the example of FIG. 2b, the extraction pressure value $p_e$ is reached in a time $t_r$ with a gradual increase in the pressure from an initial value $p_0$. The pressure curve of FIG. 2b may be achieved by starting the hydraulic pump with an acceleration profile which may be programmed by means of the control unit from zero to a predetermined speed corresponding to a given extraction pressure value $p_e$. The acceleration profile may be selected so that it is adapted to the coffee blend being used and/or the type of beverage to be dispensed. The pressure curve during dispensing is controlled by means of the pressure sensor which sends the data to the control unit which carries out, where necessary, adjustments by acting on the speed of rotation of the pump.

The pressure curve shown in FIG. 2c represents a dispensing step which comprises an initial step of wetting followed by a step of extraction. During an initial time period $t_w$ the dispensing duct of the dispensing device supplies water at a pressure having a first, relatively low, value, $p_w$ (wetting step). At the time $t_w$, the pressure is increased to a second value $p_e$ greater than the first value $p_w$, the second value representing the extraction pressure (extraction step). The extraction step takes place for a predetermined time ($t_e$–$t_w$) where $t_e$ is the total dispensing time. The curve of FIG. 2c shows the case in which the pressure changes rapidly (with respect to the time $t_e$) from the value $p_w$ to the value $p_e$. However, an embodiment may comprise a gradual increase of the pressure from $p_w$ to $p_e$ according to a stepped acceleration similar to that described with respect to FIG. 2b.

According to an embodiment, to obtain the pressure curve of FIG. 2c, the control unit 22 controls, at the initial dispensing time t=0, the opening of the intercepting valve 26 in the device of FIG. 1 for a time $t_w$, for example 3 seconds. During the time $t_w$, the pump 4 is off and therefore the water which is supplied to the dispensing duct (for example 25) has a relatively low pressure $p_w$, for example 1 bar. Subsequently, the pump 4 is actuated at a predetermined speed value for a given time period ($t_e$–$t_w$) which corresponds to a nominal extraction pressure $p_e$.

In general, it is possible to set, in the control unit, a pressure curve p(t) as a function of time, where $0 \leq t \leq t_e$.

During the dispensing step, following starting of the pump, by monitoring the flow rate of water detected by the device, the control unit may modify the speed of rotation of the pump in order to increase or decrease the pressure generated by the pump to adjust the flow of water and for example to bring it to a desired value for a certain type of dispensing. For example, it may be necessary to correct the pressure if there is a deviation caused by variables connected with the fineness of grinding and the nature of blends. Controlling both the flow of water by means of the flow measurement device and the dispensing pressure by means of the pressure sensor makes it possible to keep the dispensing process within an optimum range.

For example, it may be that, as a result of the anomalous presence of coffee which is too finely ground, an increase in the thrust of the pump may not correspond to a greater flow of water and therefore to a greater pressure of the water supplied to the dispensing device, but only further obstructs the filter causing an excessive pressure which worsens the quality of the beverage.

The method of controlling the dispensing pressure preferably comprises the control of the actual flow rate of water which is supplied by the pump by means of a water flow rate measurement device disposed in the hydraulic circuit between the pump and the dispensing device. In particular, with reference to FIG. 1, the flow measurement device may be arranged in the duct 3 which supplies the water from the pump to the heat exchanger or in the cold-water duct 8 or in the supply duct 11.

In an embodiment, the control unit may monitor whether a predetermined threshold dispensing pressure value is being exceeded and, if so, the control unit may indicate the anomaly, for example by means of an acoustic and/or visual signal.

Although FIG. 1 shows only one dispensing unit, the present invention includes a coffee machine comprising a plurality of dispensing units each in fluid communication with the supply duct in its turn in fluid communication with a hydraulic pump.

Although not explicitly mentioned in the preferred embodiments described above, the present invention may include a coffee machine which uses pre-packaged pods of ground coffee.

The foregoing is considered as illustrative only of the principles of the invention. Since numerous modifications and changes will readily occur to those skilled in the art, it is not desired to limit the invention to the exact construction and operation shown and described, and accordingly, all suitable modifications and equivalents may be resorted to, without departing from the spirit and scope of the invention as defined in the appended claims.

The invention claimed is:

1. A method for controlling the dispensing pressure and flow rate of water in a coffee machine for producing and dispensing coffee-based beverages which includes a dispensing device comprising a filter unit configured for containing ground coffee, the method comprising:
  supplying a predetermined quantity of water from a hydraulic pump constructed to supply variable quantities of water at a rate of flow corresponding to at least one nominal dispensing pressure value to a hydraulic circuit in fluid communication with the hydraulic pump and the dispensing device, in which the hydraulic pump is actuatable by an electronic drive,
  detecting at least one dispensing pressure value of the water by means of a pressure sensor arranged along the hydraulic circuit, and
  if the at least one dispensing pressure value detected deviates from the at least one nominal pressure value, adjusting the flow of water supplied by the pump as a function of the at least one dispensing pressure value detected while continuing the flow of water through the dispensing device to adjust the detected dispensing pressure to the at least one nominal dispensing pressure value,
  wherein supplying the predetermined quantity of water comprises detecting at least one value of the flow rate of water supplied by the pump by means of a flow rate measurement device arranged in the hydraulic circuit,
  the method further comprising selecting a nominal flow rate value corresponding to a nominal dispensing time, wherein adjusting the flow rate of water supplied by the pump is carried out such that the predetermined quantity of water is supplied to the filter unit in an actual time substantially equal to the nominal dispensing time, and
  stopping the pump when the quantity of water which has passed through the flow rate measurement device is equal to the predetermined quantity of water, thereby providing for an independent measurement of the dispensing pressure and of the flow rate to provide for the dispensing of coffee-based beverages of desired quality from different grinds of the ground coffee in the filter unit.

2. A method according to claim 1, wherein regulating the flow rate of water is performed by varying the speed of rotation of the pump.

3. A method according to claim 1, wherein the hydraulic pump is actuatable at variable speed and supplying the predetermined quantity of water comprises selecting at least one value of speed of rotation of the pump for a dispensing time, the at least one value of the speed of rotation corresponding to the at least one nominal pressure value.

* * * * *